Aug. 22, 1950   R. B. ESTES   2,520,032
MEAT TENDERIZING MACHINE
Filed Oct. 24, 1947   2 Sheets-Sheet 2
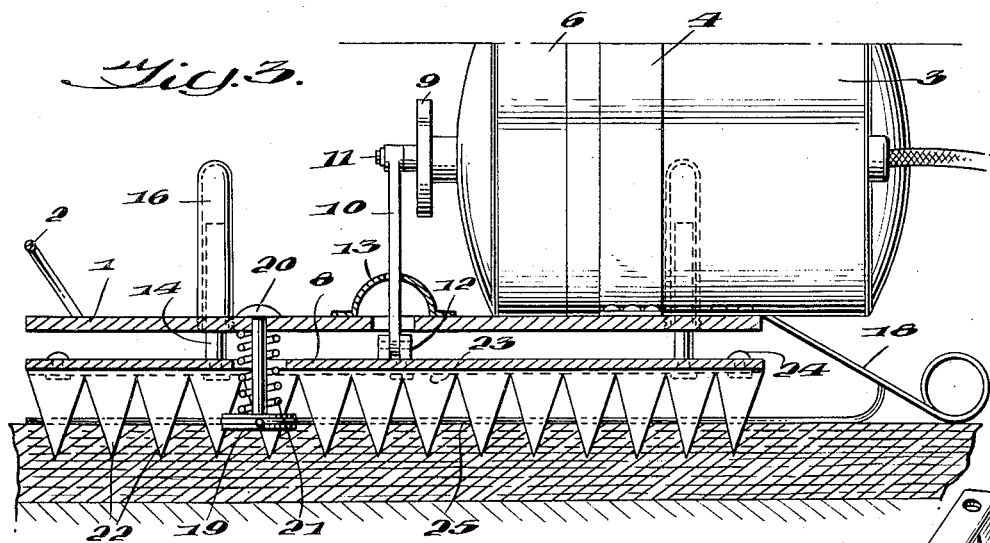
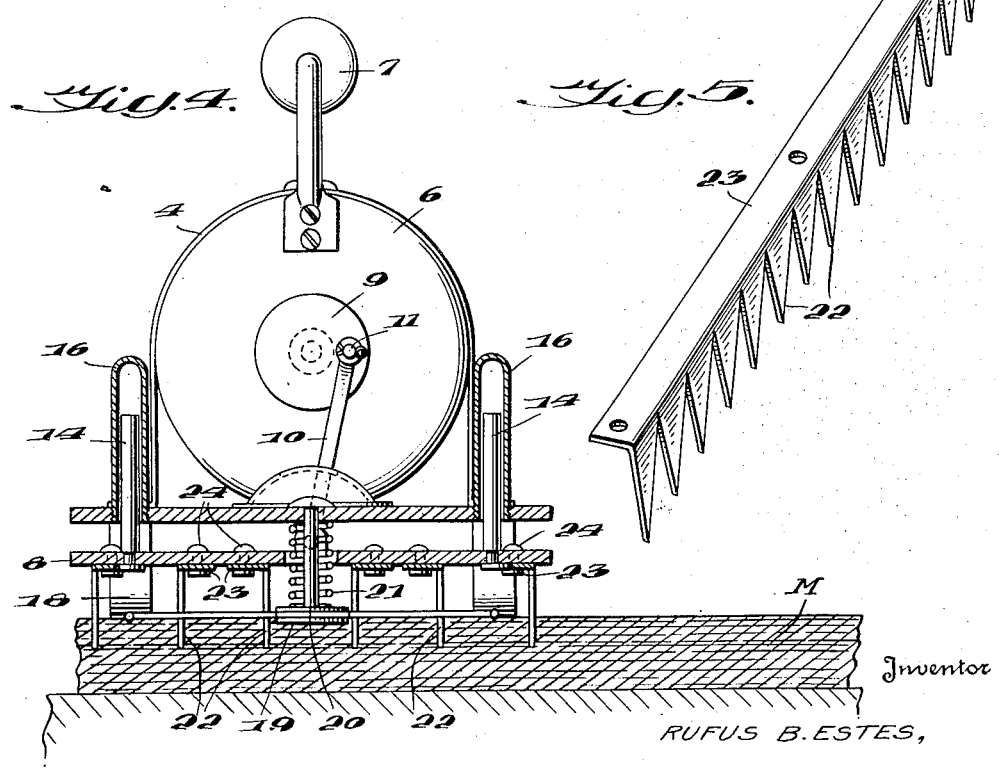
RUFUS B. ESTES,
Inventor Patented Aug. 22, 1950

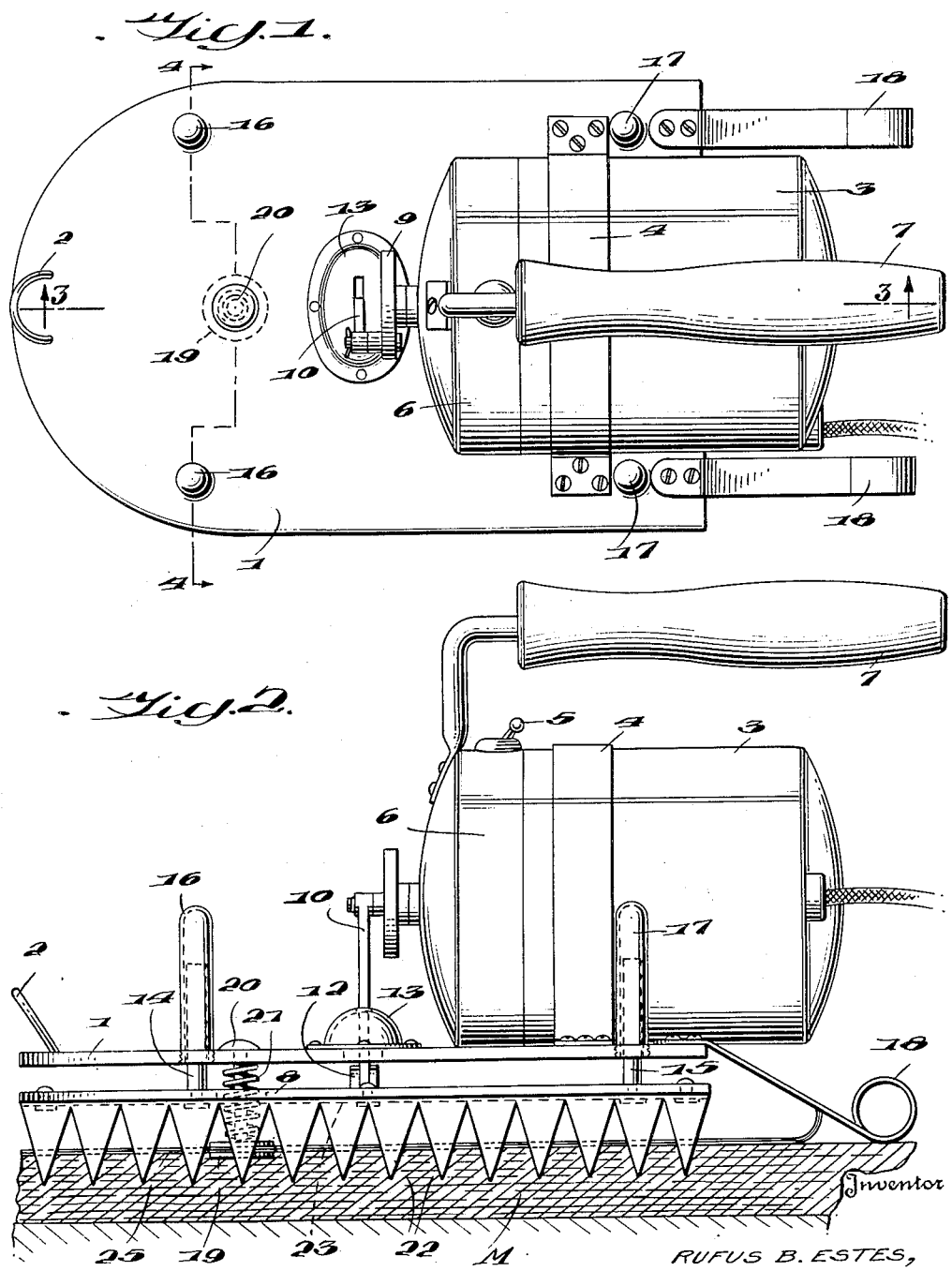

2,520,032

UNITED STATES PATENT OFFICE 2,520,032

MEAT TENDERIZING MACHINE

Rufus B. Estes, Knoxville, Tenn.

Application October 24, 1947, Serial No. 781,818

5 Claims. (Cl. 17—25)

1

This invention relates to improvements in meat tenderizing machines, of the character used particularly for tenderizing steak, chops, etc.

Various machines have been proposed heretofore for this purpose, but these have not been entirely satisfactory because of complexity of structure, expensiveness thereof, and in most instances, it has been necessary to remove the bone from the meat before applying a tenderizing action thereto. On the other hand, the presence of the bone in the meat during the cooking action materially improves the flavor of the meat and is therefore very highly desirable to retain. Consequently, it is preferred that the tenderizing action be applied without removal of the bone when that is possible.

The object of this invention is to improve the construction of tenderizing machines for this purpose, not only by simplifying and reducing the cost thereof, but also by enabling the machine to operate on the meat without the necessity for removal of the bone therefrom.

In carrying out this object according to one embodiment of the invention, the machine utilizes the tenderizing action obtained by the reciprocating motion of a cutter plate mechanism applied which will impart the desired action to the meat and may be guided around the bone so as to apply such action substantially over the entire area of the meat without interference nevertheless by the presence of the bone.

According to this embodiment, a series of teeth are mounted on a cutting plate which later is adapted to be reciprocated in guided vertical relation by the operation of an electric motor that is mounted on a support plate or platform. The operation of the motor causes vertical reciprocating movements at rather fast acceleration of the cutting plate and knives or cutters attached thereto, which imparts a tenderizing action to the meat as the device is guided thereover. The forward end of the machine preferably is so formed that it may be guided around bones and other irregular parts of the meat so as to apply the tenderizing action thereto without the necessity for removing the bone in order to accomplish this result.

This embodiment is illustrated in the accompanying drawings in which:

Fig. 1 is a top plan view of the machine.

Fig. 2 is a side elevation thereof.

Fig. 3 is a longitudinal sectional view therethrough substantially on the line 3—3 in Fig. 1 with parts in elevation.

Fig. 4 is a vertical cross section substantially on the line 4—4 of Fig. 1.

Fig. 5 is a perspective view of one of the cutting knives removed.

In the embodiment of the invention as shown in the drawings, merely for purpose of illustration, the invention may be constructed with a supporting plate generally designated at 1 which

2 forms a platform or support for the operating parts of the machine. The forward end of this supporting plate or platform is shown as rounded or semi-circular as illustrated in Fig. 1 to facilitate guiding thereof around parts of bone in the meat. A supporting loop is shown at 2 to form a hanger or support for the machine, when not in use.

Mounted on the platform 1 is an electric motor 3 secured rigidly thereto by a band 4 that encircles the motor and is attached at opposite ends to the support 1 for anchoring the motor securely in place thereon. This is shown to be an electric motor, and is provided with a control switch 5. As a part of the motor or connected as a unit therewith is a speed reducing transmission unit 6. Attached to the motor at the top thereof is a handle 7. This handle extends lengthwise over the motor and is of a size and shape to facilitate handling of the machine not only for guiding it in use but also for moving it into and out of operative position. The switch 5 is shown in convenient relation to the handle 7 for operation of the switch by the thumb or finger of the operator as he grips the handle.

A cutting plate is shown at 8 mounted beneath the support or plate 1. The plate 8 is adapted to be moved up and down relative to the support 1 in reciprocating motion, for which purpose I have provided an eccentric 9 connected with the output shaft of the motor unit 3—6. The eccentric 9 is connected through a link 10 with the cutting plate 8, one end of which link is pivoted to the eccentric 9 at 11 while the opposite end thereof is pivoted at 12 to the cutting plate 8. The link 10 extends through an opening in the support 1 having a slotted cover 13 thereover.

The cutting plate 8 will be reciprocated vertically relative to the support 1 by the operation of the motor unit 3—6. Such vertical movement will be restricted to a vertical direction by guide rods 14 and 15 attached to the cutting plate 8 and slidably received in guides 16 and 17 respectively attached to the support or plate 1. The guiding action of these members 14—17 will hold the cutting plate 8 and confine it to a vertical direction.

Provision is made for yieldably supporting the machine upon the meat, for which purpose I have shown a pair of spring arms 18 attached to the rearward end of the support or plate 1 and an equalizing member 19 attached thereto adjacent the front portion of the support 1. The equalizing member 19 is mounted on a rod 20 normally pressed downward by a coiled spring 21, which spring and rod extend through an enlarged opening in the cutting plate 8 as shown in Fig. 4. This equalizing member 19 coacts with the spring arms 18 for supporting the machine yieldably upon the meat M.

The cutters are shown at 22, in the form of knives preferably formed integral on a plate 23 attached by bolts 24 or otherwise to the undersurface of the cutting plate 8. As many of the knives 23 as found desirable may be used according to the desired tenderizing action, but I have shown such knives spaced transversely of the cutting plate 8 and extending lengthwise substantially throughout the length thereof.

If found desirable, stripper members may be used to separate the meat from the cutters 22. I have shown such stripper members in the form of wire generally designated at 25 extending lengthwise substantially throughout the length of the cutting plate 8 between the knives 22 and preferably attached to the springs 18 and the equalizing member 19 to hold the stripper wires in proper position so as to be guided over the meat to aid in removing the meat from the knives as the latter are reciprocated.

The use of the machine will be evident from the foregoing description. The operator handles the machine manually by placing it in position over the piece of the meat on a block or other support and guides it over the surface of the meat by manipulation of the handle 7. The operation of the motor 3—6 causes a vertical reciprocating movement of the cutting plate 8 and knives 22 in rapid operation, to project the cutters into the surface of the meat and impart a tenderizing action thereto in rapid fashion. The cutting plate 8 will be guided in its vertical movement by the guide members 14—17, while the machine may be guided manually over the surface of the meat by the spring arms 18 and 19.

This machine results in the imparting of an effective tenderizing action to the meat during its operation, not only in the major portion of the area thereof, but also in the region around a bone in the meat. It is thus possible to apply such tenderizing action in meat without the removal of the bone therefrom, which is highly desirable because of the improved flavor obtained by the presence of the bone.

While the invention has been illustrated and described in one embodiment, it is recognized that variations and changes may be made therein without departing from the invention except as specified in the claims.

I claim:

1. A meat tenderizing machine comprising a supporting plate, a motor mounted on the supporting plate, a handle connected with the supporting plate for manual manipulation of the machine, a cutting plate extending beneath the supporting plate and approximately parallel therewith, means operatively connecting the cutting plate with the motor for causing reciprocating movement of the cutting plate relative to the supporting plate, means for guiding said reciprocating movement of the cutting plate in a vertical direction relative to the supporting plate, and tenderizing members carried by the cutting plate and depending therefrom.

2. A meat tenderizing machine comprising a horizontal supporting plate, a motor mounted on the supporting plate, a handle connected with the supporting plate for manual manipulation of the machine, a horizontal cutting plate extending beneath the supporting plate and approximately parallel therewith, means operatively connecting the cutting plate with the motor for causing reciprocating movement of the cutting plate toward and from the supporting plate, means for guiding said reciprocating movement of the cutting plate in a vertical direction toward and from the supporting plate, and tenderizing members carried by the cutting plate and depending therefrom.

3. A meat tenderizing machine comprising a horizontal supporting plate, a motor mounted on the supporting plate, a handle connected with the supporting plate for manual manipulation of the machine, a horizontal cutting plate extending beneath the supporting plate and approximately parallel therewith, means operatively connecting the cutting plate with the motor for causing reciprocating movement of the cutting plate toward and from the supporting plate, means for guiding said reciprocating movement of the cutting plate in a vertical direction toward and from the supporting plate, and tenderizing members carried by the cutting plate and depending therefrom, said tenderizing members including blades extending lengthwise of the cutting plate and spaced apart transversely thereof with bottom cutting edges thereon.

4. A meat tenderizing machine comprising a horizontal supporting plate, a motor mounted on the supporting plate, a handle connected with the supporting plate for manual manipulation of the machine, a horizontal cutting plate extending beneath the supporting plate and approximately parallel therewith, means operatively connecting the cutting plate with the motor for causing reciprocating movement of the cutting plate toward and from the supporting plate, means for guiding said reciprocating movement of the cutting plate in a vertical direction toward and from the supporting plate, and tenderizing members carried by the cutting plate and depending therefrom, said tenderizing members including blades extending lengthwise of the cutting plate and spaced apart transversely thereof with bottom cutting edges thereon, and stripper wires carried by the supporting plate and extending lengthwise thereof beneath the cutting plate and between the blades for separating the blades from the meat.

5. A meat tenderizing machine comprising a horizontal supporting plate, a motor mounted on the supporting plate, a handle connected with the supporting plate for manual manipulation of the machine, a horizontal cutting plate extending beneath the supporting plate and approximately parallel therewith, means operatively connecting the cutting plate with the motor for causing reciprocating movement of the cutting plate toward and from the supporting plate, means for guiding said reciprocating movement of the cutting plate in a vertical direction toward and from the supporting plate, and tenderizing members carried by the cutting plate and depending therefrom, the tenderizing members extending directly to the forward end of the cutting plate to cause a tenderizing action around a bone in the meat.

RUFUS B. ESTES.

REFERENCES CITED

The following references are of record in the file of this patent:

UNITED STATES PATENTS

| Number | Name | Date |
|---|---|---|
| 961,019 | Roberts | June 7, 1920 |
| 1,500,811 | Guggenheim | July 8, 1924 |
| 1,751,628 | Guggenheim et al. | Mar. 25, 1930 |
| 2,083,848 | La Barge | June 15, 1937 |